Jan. 28, 1930.  J. S. KILLEEN  1,744,905
AEROPLANE PROPELLER
Filed July 12, 1928  2 Sheets-Sheet 1
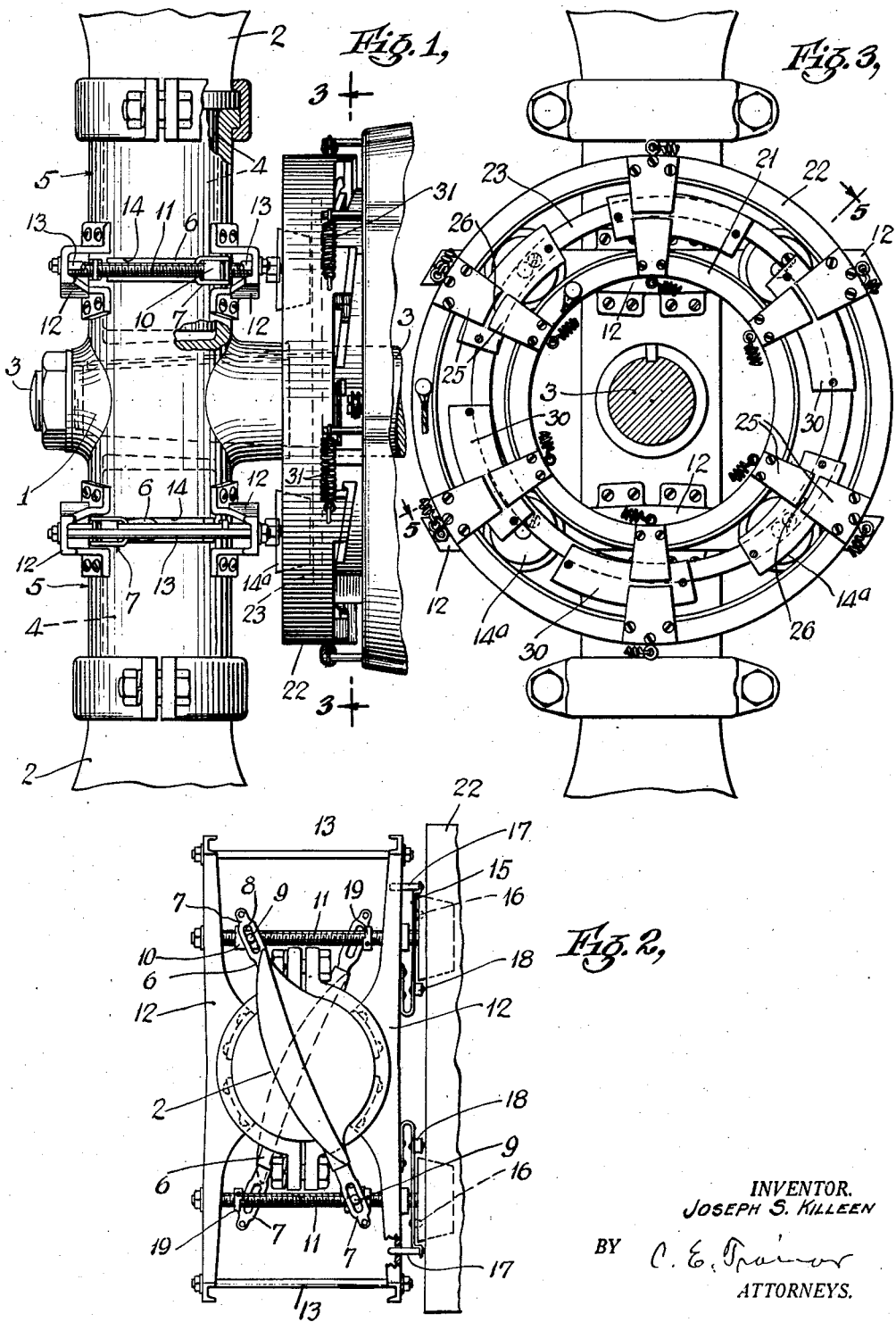
INVENTOR.
JOSEPH S. KILLEEN
BY C. E. Trainor
ATTORNEYS.

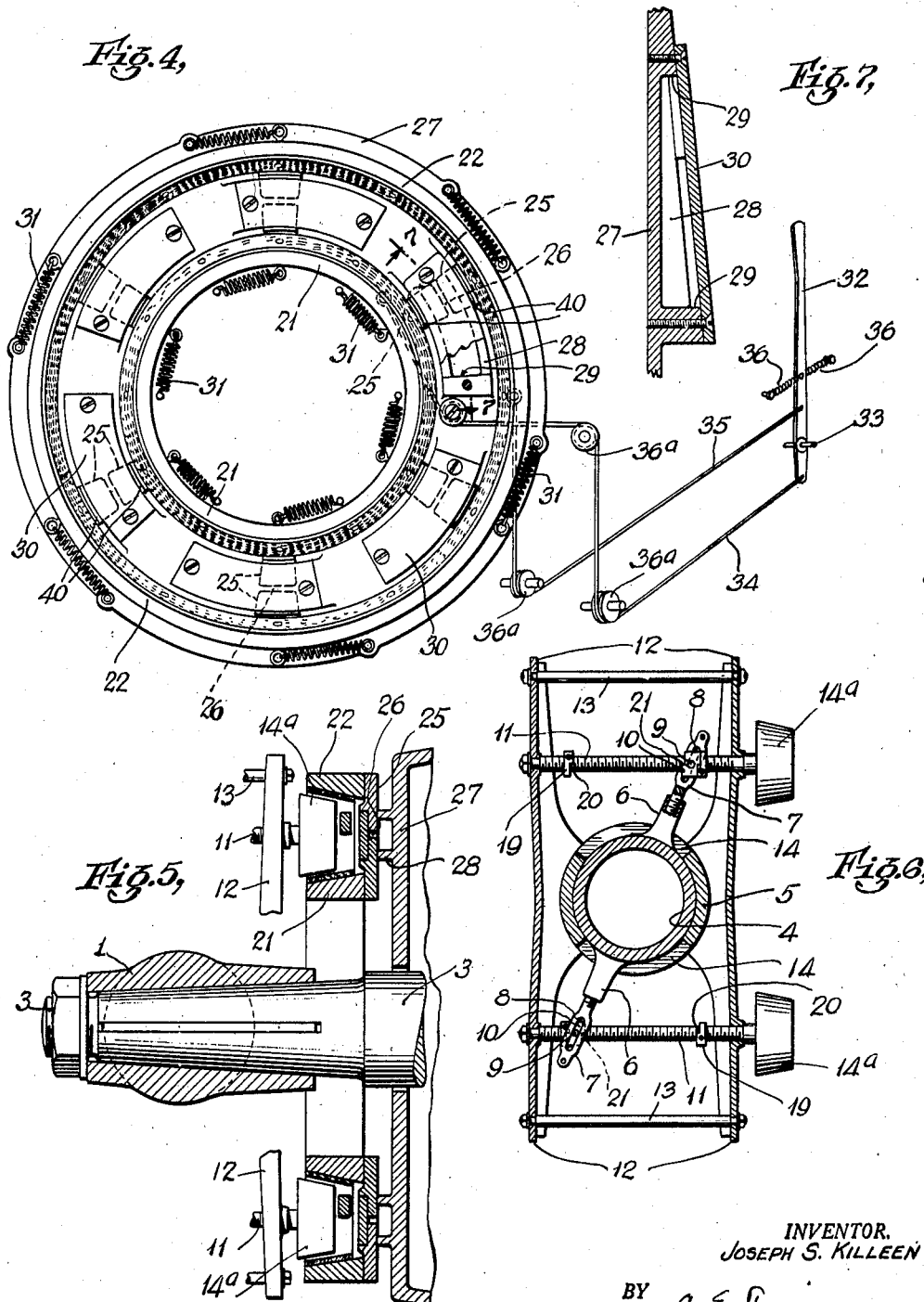

Patented Jan. 28, 1930

1,744,905

UNITED STATES PATENT OFFICE.

JOSEPH S. KILLEEN, OF NEW YORK, N. Y.

AEROPLANE PROPELLER

Application filed July 12, 1928. Serial No. 292,119.

This invention is an improvement in aeroplane propellers, and more particularly in propellers of the type wherein means is provided for changing the pitch of the blades while the propeller is operating.

In the usual construction, the blades are fixed with respect to the hub, and they exert the same pulling power at like engine speeds at all times.

It is sometimes desirable, and especially in landing, to provide for a braking action on the speed of the plane, and the only safe manner in which such action can be attained is through the propeller.

One of the primary objects of the invention is the provision of a propeller in which the pitch of the blades may be changed while the propeller is rotating, thus to provide for variations in pulling power without changing the speed of the engine, and to enable a braking action on the speed of the plane by the propeller.

Another object is the provision in such means of a positive lock to prevent accidental displacement of the blades after they have been set at the desired pitch.

Another object is the provision of mechanism of simple construction for enabling the change to be made easily and expeditiously from a distance, as for instance, from the body of the vehicle.

With these and other objects in view the invention consists in the construction and novel combination of parts fully described hereinafter, illustrated in the accompanying drawings, and pointed out in the claims appended hereto, it being understood that various changes in the form, proportion, size and minor details of construction within the scope of the claims may be resorted to without departing from the spirit of the invention.

In the drawings forming a part hereof:—

Fig. 1 is a side view of the hub portion and part of the blades of a propeller constructed in accordance with the invention.

Fig. 2 is a plan view of the propeller.

Fig. 3 is a rear view of Fig. 1.

Fig. 4 is a front view of the operating mechanism for changing the pitch.
Fig. 5 is a section on the line 5—5 of Fig. 3.

Fig. 6 is a horizontal section at the level of the operating mechanism for one blade.

Fig. 7 is a section on the line 7—7 of Fig. 4.

In the present embodiment of the invention the improved propeller comprises a hub portion 1 and similar blades 2 extending in opposite directions from the hub portion and rotatably connected therewith on axes radial to the hub. The hub is connected with the shaft 3 of the engine in the usual manner, to rotate therewith, and the blades have reduced ends indicated at 4, which fit within radial sockets 5 forming a part of the hub.

Each blade is provided at the reduced portion with a pair of oppositely extending arms, each of which includes a socket 6 rigid with the blade, and a portion 7 having threaded engagement with the socket. Each of the portions 7 is longitudinally slotted as shown at 8, and the slot of each arm is engaged by a pin 9 on a nut 10, which is rotatably mounted on a screw 11, journaled parallel with the axis of the hub, and supported by a pair of brackets 12, securely bolted to the hub and forming a part thereof, as shown in Figs. 2 and 6. These brackets extend transversely of the hub in parallel relation, and are connected at their outer ends by bolts 13.

Two pairs of screws 11 are provided, one pair for each blade, and the pairs are arranged on opposite sides of the hub. The screws of each pair are oppositely threaded, that is, one being a right hand, and the other a left hand screw, and it will be apparent that when the screws of a pair are rotated in the same direction, the arms 6—7 will be oppositely moved, or will be both moved in a direction to shift the blade, that is, to change the pitch thereof. The arms 6—7 extend through circumferentially extending slots 14 in the hub sockets.

A frusto-conical wheel 14ª is secured to the rear end of each screw 11, and the periphery of each wheel is preferably covered with material having the high coefficient of friction. It will be apparent, however, that the wheels might be made of such material. The screws revolve with the propeller about the axis of the hub, and they serve as a lock to prevent accidental rotation of the blades on their radial axes. Usually there is little or no tendency to angular displacement of the screws, but a spring lock indicated at 15 is provided in connection with each wheel.

Each of these locks is in the form of a substantially U-shaped spring plate, having one arm secured to the adjacent bracket 12, and the other provided with a pin 16 engaging a depression in the front face of the wheel. The free end of the portion having the pin 16 is provided with a guide pin 17, which moves in an opening in the bracket. It will be noticed referring to Fig. 2, that each spring is offset rearwardly at the pin 17, and is provided near its connection with the other arm with a stop 18. Both of these elements, namely; the offset portion of the spring and the stop 18 extend into position to be engaged by rotating means for the wheels and screws to be later described in detail.

Means is also provided for limiting the movement of the nuts 10 on the screws. This mechanism is in the form of stops 19 secured to each screw near the brackets 12. Each stop as shown has a shoulder 20, which is adapted to be engaged by a similar shoulder 21 on the nut. That is, the nut has a shoulder at each end, to provide for engagement with each stop. When so engaged the screw is prevented from further rotation, so that the movement of the blades in each direction is limited to the desired extent. The stops 19 are adjustable on the screws, being in fact nuts, having set screws as shown to hold them in place.

The axes of the screws are in the perimeter of a circle having the axis of the propeller as its center, and they are caused to rotate in opposite directions, when desired, by inner and outer rings 21 and 22 respectively. The inner surfaces of these rings are inclined or conical as shown, to fit the peripheries of the wheels 14ª, and it will be apparent that when the wheel 21, for instance, is moved into engagement with the wheels, a drag will be exerted on the wheels while the propeller is rotated.

This causes rotation of the screws in one direction, and consequent movement of the arms 6—7, and a change in pitch of the blades. In order to constrain the wheels 14ª to rotate together, they are connected by a ring 23, which is pivotally connected to each wheel at a point eccentric to the axis thereof. As the wheels rotate, the ring moves with them, having a limited eccentric motion between the rings 21 and 22. Each of the rings 21 and 22 has its operative face provided with a facing 24 of a suitable material, having a high coefficient of friction.

Each of the rings 21 and 22 has on its rear face radially extending plates 25 secured to the ring by screws as shown, and extending toward the other ring. That is, the plates extend toward each other, and they are similarly placed, so that the plates and the rings are in register. The adjacent ends of the plates are spaced apart somewhat as shown in Figs. 3 and 4. The plates 25 move at their free ends in cam slots 26 on a relatively fixed disk 27, supported in any suitable manner. Preferably the cam slots are provided by integral inclined ribs 28 on the disk 27, all of the ribs being curved on the propeller shaft axis for a center, and all being inclined in the same direction. The ribs have stops 29 at their ends, and a holding plate 30 is secured to the stops, the plate forming with the rib top the cam slot. The plates may be held in place in any suitable manner, as for instance by the screws as shown.

The arrangement is such that when a ring 21 for instance, is turned angular with respect to the propeller shaft it is forced forwardly by the adjacent cam slot, and into engagement with the outer surfaces of the wheels 14ª. The rings are supported by the disk 27, and springs 31 are provided for restoring the rings to normal position. The springs are arranged in sets of three in the present instance, one set for each ring, and they normally hold the rings in inoperative position.

The rings are moved angularly in opposite directions, by means of a lever 32, pivoted at a suitable point near one end as indicated at 33. Flexible members 34 and 35, as for instance, cords connect the lever below and above its pivotal connection, with the respective rings, the cord 34 being connected with the inner ring 21, while the cord 35 is connected with the outer ring 22. The lever is normally held in neutral position by springs 36 on opposite sides thereof. The flexible members 34 and 35 pass over suitable guide pulleys 36ª to their connection with the rings.

The operation of the device as a whole is as follows. The change in pitch is especially desirable in landing, to check the speed of the vehicle. When it is desired to change the pitch, one of the rings is moved forwardly, in accordance with whether it is intended to increase or decrease the pitch. In landing, for instance, the angle of the blades is to be lessened, that is, the screws must be turned in a direction to flatten the blade.

When it is desired to lessen the pitch, the lever 32 is operated to move the outer ring into engagement with the wheels. The drag exerted on the wheels causes rotation of the screws, and the plates are moved in a direction to lessen the pitch. When it is desired to increase the pitch, the lever 32 is moved in the opposite direction, and it will be evident that the blades will be moved in a direction to increase the pitch thereof.

When either ring is moved into operative position, it engages the stops 17 or 18, as the case may be, and releases all of the wheels 14ª. As soon as the ring is withdrawn, the spring plate presses the pin 16 back into engaging position. It will be understood that a number of openings may be provided on each wheel for engagement by the pin 16, so that the wheels will be locked in whatever position they stop, or after a very slight angular movement, that is, only a very slight angular movement is necessary to cause engagement of the pin with the wheel.

What is claimed as new is:—

1. In an aeroplane propeller, including a hub, and a pair of oppositely arranged blades journaled thereon on axes radial to the hub, means for simultaneously changing the pitch of the blades, including a pair of cooperating elements for each blade, each pair including a nut and a screw threaded thereon, corresponding elements of the pairs being supported by the blade and by the hub respectively, and a plurality of relatively fixed means, each for exerting a simultaneous drag on the corresponding elements of the pairs in one direction to cause them to be rotated with respect to the other elements of the pairs during their rotation with the propeller.

2. In an aeroplane propeller, including a hub and a pair of oppositely arranged blades journaled thereon on axes radial to the hub, means for simultaneously changing the pitch of the blades, including a pair of cooperating elements for each blade, each pair including a screw supported by the hub, and a nut supported by the blade and threaded onto the screw, a plurality of means for simultaneously exerting a drag on the screws to cause them to be rotated with respect to the nuts during the rotation of said nuts with the propeller, said means engaging the screws at opposite points to provide for movement thereof in either direction.

3. In an aeroplane propeller, including a hub and a pair of oppositely arranged blades journaled thereon on axes radial to the hub, means for simultaneously changing the pitch of the blades, including a pair of nuts supported by each blade, the members of the pair at opposite sides thereof, and a screw for each nut supported by the hub and having threaded engagement with the screw, each screw having a friction wheel at one end thereof, and friction rings, one supported at the outer side of the wheels, and the other at the inner side thereof, and means to alternately move the rings into engagement with the wheels.

4. In an aeroplane propeller, including a hub and a pair of oppositely arranged blades journaled thereon on axes radial to the hub, means for simultaneously changing the pitch of the blades, said means including a bracket supported by the hub and having oppositely extending pairs of arms, a screw journaled in each pair of arms parallel to the axis of rotation of the propeller, each blade having oppositely extending arms, a nut supported by each arm and having threaded engagement with the adjacent screw, the screws in connection with each blade being oppositely threaded, and a plurality of relatively fixed means, each for simultaneously engaging the screws to exert a drag thereon, thereby to cause the screws to rotate during the rotation of the propeller, one of said means engaging the inner sides of the screws and the other the outer sides.

5. In an aeroplane propeller, including a hub and a pair of oppositely arranged blades journaled thereon on axes radial to the hub, means for simultaneously changing the pitch of the blades, said means including a bracket supported by the hub and having oppositely extending pairs of arms, a screw journaled in each pair of arms parallel to the axis of rotation of the propeller, each blade having oppositely extending arms, a nut supported by each arm and having threaded engagement with the adjacent screw, the screws in connection with each blade being oppositely threaded, and a plurality of relatively fixed means, each for simultaneously engaging the screws to exert a drag thereon, thereby to cause the screws to rotate during the rotation of the propeller, one of said means engaging the inner sides of the screws and the other the outer sides, each of said means including a substantially conical ring, the screws having frusto-conical wheels for engagement by the rings.

6. In an aeroplane propeller, including a hub and a pair of oppositely arranged blades journaled thereon on axes radial to the hub, means for simultaneously changing the pitch of the blades, said means including a bracket supported by the hub and having oppositely extending pairs of arms, a screw journaled in each pair of arms parallel to the axis of rotation of the propeller, each blade having oppositely extending arms, a nut supported by each arm and having threaded engagement with the adjacent screw, the screws in connection with each blade being oppositely threaded, and a plurality of relatively fixed means, each for simultaneously engaging the screws to exert a drag thereon, thereby to cause the screws to rotate during the rotation of the propeller, one of said means engaging the inner sides of the screws and the other the outer sides, each of said means including a substantially conical ring, the screws having frusto-conical wheels for engagement by the rings, and a common means for moving the rings in opposite directions.

7. An aeroplane propeller, including a hub and a pair of oppositely arranged blades journaled thereon on axes radial to the hub, each blade having at its inner end a pair of oppositely extending arms, a pair of screws for each blade journaled at opposite sides thereof and at equal distances from the axis of the blade, each arm carrying a nut having threaded engagement with the adjacent screw, each nut having a limited radial movement on the arm with respect to the blade axis to enable it to follow the screw in the angular movement of the blade, and means to simultaneously engage all of the screws to exert a braking action thereon to cause them to rotate with respect to the nuts during the rotation of said nuts with the propeller.

8. In an aeroplane propeller, including a hub, and a pair of oppositely arranged blades journaled thereon on axes radial to the hub, means for simultaneously changing the pitch of the blades, including a plurality of pairs of cooperating elements, each pair including a screw and a nut, threaded thereon, the nuts being supported by the blades and the screws by the hub respectively, the screws being spaced at equal distances from the axis of the hub, and a plurality of relatively fixed friction rings, one arranged at the outer sides of the screws and the other at the inner sides, and means to alternately move said rings into engagement with the screws, thereby to exert drag thereon in either direction for the purpose set forth.

9. In an aeroplane propeller including a hub and a pair of oppositely arranged blades journaled thereon on axes radial to the hub, means for simultaneously changing the pitch of the blades, including screws connected with one of said elements, and nuts connected with the other of said elements, means for exerting drag on the screws to cause them to be rotated with respect to the nuts whereby to move the nuts longitudinally of the screws, and means adjustable on the screws for limiting the movement of the nuts in either direction.

10. In an aeroplane propeller including a hub and a pair of oppositely arranged blades journaled thereon on axes radial to the hub, means for simultaneously changing the pitch of the blades, including screws connected with one of said elements, and nuts connected with the other of said elements, means for exerting drag on the screws to cause them to be rotated with respect to the nuts whereby to move the nuts longitudinally of the screws, means adjustable on the screws for limiting the movement of the nuts, and spring actuated means for holding the screws in adjusted position.

Signed at 3340 Broadway in the county of New York and State of New York, this 5th day of July A. D. 1928.

JOSEPH S. KILLEEN.